United States Patent Office 2,820,799
Patented Jan. 21, 1958

2,820,799
PROCESSES FOR PREPARING LIPOYL CHLORIDE

Arthur F. Wagner, Princeton, N. J., assignor to Merck & Co., Inc., Rahway, N. J., a corporation of New Jersey No Drawing. Application July 11, 1955
Serial No. 521,391

3 Claims. (Cl. 260—327)

This invention is concerned generally with novel processes for preparing chemical compounds. More particularly, it relates to an improved process for preparing lipoyl chloride starting with an alkali metal lipoate. The lipoyl chloride thus obtained is valuable as an intermediate in the production of lipoamide and lipol which are effective growth-promoting agents for chicks.

In accordance with the present invention, an alkali metal lipoate (Compound 1 hereinbelow) is reacted with oxalyl chloride thereby forming lipoyl chloride (Compound 2). This reaction may be chemically represented as follows:

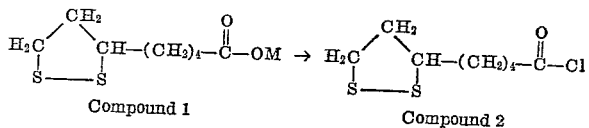

Compound 1        Compound 2

In the chemical formula identified as Compound 1, M stands for alkali metal.

The reaction between the alkali metal salt of lipoic acid and oxalyl chloride is conveniently conducted by bringing the reactants together in an inert organic liquid, for example a hydrocarbon solvent such as benzene. As the alkali metal salt of lipoic acid I can utilize potassium lipoate, sodium lipoate, and the like. The reaction is ordinarily carried out at below room temperature, preferably at about 0° C., under which conditions the reaction is usually substantially complete in about two to three hours. The lipoyl chloride formed by the reaction is recovered from the reaction mixture by filtering to remove inorganic salts, and evaporating the hydrocarbon solvent from the filtered solution.

The following example illustrates a method of carrying out the present invention, but it is to be understood that this example is given for purposes of illustration and not of limitation.

Example 1

Oxalyl chloride (10 ml.), dissolved in 40 ml. of anhydrous benzene, was cooled in an ice bath, while 3.2 g. of sodium lipoate was added in small portions in a 45-minute period. The reaction mixture was stirred for an additional 2.5 hours.

The reaction mixture was filtered and concentrated in vacuo. The residue was redissolved in 20 ml. of benzene and concentrated in vacuo. Yield 2.7 g. of lipoyl chloride.

Various changes and modifications may be made in carrying out the present invention without departing from the spirit and scope thereof. Insofar as these changes and modifications are within the purview of the annexed claims, they are to be considered as part of my invention.

I claim.

1. The process which comprises reacting an alkali metal α-lipoate with oxalyl chloride in a substantially anhydrous hydrocarbon solvent thereby forming α-lipoyl chloride.

2. The process which comprises reacting sodium α-lipoate with oxalyl chloride in anhydrous benzene to form α-lipoyl chloride.

3. The process which comprises reacting potassium α-lipoate with oxalyl chloride in anhydrous benzene to form α-lipoyl chloride.

References Cited in the file of this patent

Adams: J. A. C. S., 42, 599–611 (1920).